United States Patent [19]

Holmen et al.

[11] 4,031,048

[45] June 21, 1977

[54] PAINT COMPOSITION FOR MARKING PAVED SURFACES

[75] Inventors: Reynold E. Holmen, White Bear Lake; Stanley J. Olander, Woodbury, both of Minn.

[73] Assignee: Minnesota Mining and Manufacturing Company, Saint Paul, Minn.

[22] Filed: Nov. 13, 1972

[21] Appl. No.: 306,688

Related U.S. Application Data

[63] Continuation of Ser. No. 239,712, March 30, 1972, abandoned.

[52] U.S. Cl. .......................... 260/22 CQ; 260/18 N; 260/18 TN; 260/37 N; 260/37 EP; 260/40 R; 260/40 TN; 260/998.19; 427/136; 427/137; 427/422; 428/406

[51] Int. Cl.² ..................... C09D 3/64; C09D 3/70; C09D 5/22

[58] Field of Search ....... 260/18 N, 22 CQ, 18 TN; 94/1.5, 22; 428/406; 427/136, 137, 422

[56] References Cited

UNITED STATES PATENTS 3,268,461  8/1966  Jacobson .......................... 260/18 N

FOREIGN PATENTS OR APPLICATIONS 1,376,329  9/1964  France ................................. 94/1.5
1,037,873  8/1966  United Kingdom ................. 94/1.5

OTHER PUBLICATIONS

The Science of Surface Coatings, Chatfield; Benn Ltd., London; 1962; p. 522.

*Primary Examiner*—Ronald W. Griffin
*Attorney, Agent, or Firm*—Cruzan Alexander; Donald M. Sell; Roger R. Tamte

[57] ABSTRACT

A paint composition that rapidly congeals to traffic-bearing condition when sprayed at an elevated temperature onto a paved surface, comprising a paint vehicle and a normally solid substantially neutral polyamide reaction product dispersed in the paint vehicle, characterized in that the ingredients from which the reaction product was made include diphenolic acid.

10 Claims, No Drawings

PAINT COMPOSITION FOR MARKING PAVED SURFACES

This is a continuation of application Ser. No. 239,712, filed Mar. 30, 1972, now abandoned.

This invention is directed to improved paint compositions and methods of the type taught in McKenzie, Ser. No. 188,448, filed Oct. 12, 1971, now abandoned, which is incorporated herein by reference. The paint compositions disclosed in that application, which form markings on paved surfaces that bear traffic immediately after application, comprise (1) a paint vehicle (a liquid that forms a nontacky adherent durable paint film when applied in a thin coating and exposed to normal ambient temperatures of 40° F to 110° F, which are representative temperatures for paved roadways during typical striping seasons); (2) a film-forming organic thermoplastic polymeric modifying material that is a solid at normal ambient temperatures, is substantially insoluble in the paint vehicle at normal ambient temperatures, and forms an at least substantially dissolved sprayable liquid blend with the paint vehicle at an elevated temperature above normal ambient temperatures; and (3) pigments in an amount sufficient to color the paint composition.

When such a paint composition is sprayed onto a roadway at elevated temperature, the composition quickly cools to a temperature at which the modifying material is not soluble in the paint vehicle, and the composition congeals to form a nontacky paint film on the roadway. The paint vehicle may include ingredients that continue to cure or react over a period of hours or days to strengthen the durability of the film, but the film is sufficiently firm and nontacky so that it will bear traffic immediately after application.

The improvement provided by the present invention is an improvement in the durability of markings formed from such compositions. Preferred compositions as taught in McKenzie, Serial No. 188,448, use a substantially neutral polyamide reaction product as the modifying material. It has now been found that markings of improved durability result if at least one weight-percent of the ingredients from which the polyamide reaction product was prepared comprise diphenolic acid, of which the following is a typical structure:

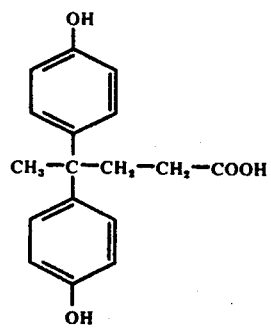

Diphenolic acids and their preparation are described in U.S. Pat. No. 2,933,520. Polyamides may be made using diphenolic acid and other acids, such as polymerized fatty acids, and product, as described in U.S. Pat. No. 2,933,517.

DETAILED DESCRIPTION

A wide variety of paint vehicles, which include a nonvolatile organic film-forming paint binder and usually also include a volatile thinner such as a volatile solvent, are useful in the invention. Typically such paint vehicles include a binder that forms a film by a curing reaction of the binder constituents, such as air-drying, oxidation reactions in which an oxygen atom crosslinks the binder constituent molecules; or reactions between reactive parts in the paint binder such as epoxy-curing agent reactions or isocyanate-curing agent reactions.

Typical binders in paint compositions of the invention are drying oils; alkyds such as medium-soya-oil, phthalicanhydride alkyds; polyurethane precursors; epoxy resins; and resin- or oil-modified varieties of such polymers. Lacquers, which form a film by evaporation of solvent as opposed to curing of the binder, are also useful in the invention. For example, vinyl toluene-butadiene copolymers are satisfactorily used as paint vehicles in paint compositions of the invention.

The paint vehicle usually exists as a continuous, single-phase material, though in some embodiments of the invention it can originally be two phases and not become a single-phase material until application to the roadway. The two parts of the paint vehicle are maintained as separate phases during storage and up to the time of application, for example, by encapsulation of the curing agent, or by storage, heating, and handling of the two reactant parts in separate containers and conduits that do not join until the application nozzle. Modifying material may be carried in both of the reactant parts, or in just one of the reactant parts.

As previously indicated, a critical aspect of the paint vehicle is the miscibility of the modifying material in the paint vehicle. At normal ambient temperatures of about 40° F to 110° F, the modifying material is solid and substantially insoluble in the paint vehicle. But in contrast to that insolubility at normal ambient temperatures, the modifying material forms a substantially dissolved sprayable liquid blend with the paint vehicle at an elevated temperature above said normal ambient temperatures. As a result, when a paint composition of the invention is applied to the substrate at the elevated temperature, the modifying material is thoroughly distributed throughout the layer. By "substantially dissolved" it is meant that a mixture of the modifying material and paint vehicle is either clear when heated to elevated temperatures or forms only a lightly cloudy mixture of very fine particles dispersed in a clear matrix.

It is preferred that the polyamide reaction product used as a modifying material according to this invention be formed from polymerized fatty acids. Such polymerized fatty acids may be prepared by polymerization of the fatty acids of drying or semi-drying oils, for example, linseed, soybean, or cottonseed oil, by any of a number of well known methods; see, for example, the article by C. G. Goebel entitled "Polymerization of Unsaturated Fatty Acids," appearing in the March, 1947 issue of the Journal of the American Oil Chemists Society. Other polyamide reaction products of polycarboxylic acids and polyamines are also useful, including linear polyamides formed by reaction of aliphatic polycarboxylic acids and aliphatic polyamines.

The exact mechanism by which durability is improved when a diphenolic-acid-containing polyamide is used as modifying material is not definitely known. But that there is an improvement in durability has been experimentally established, especially as to paved concrete, including oil-stained concrete roadways. As little as one weight-percent of diphenolic acid as an ingredient in a polyamide modifying material will provide some improved durability of an applied line, but preferably at least 5 weight-percent of the ingredients of the polyamide material is diphenolic acid. Generally, the more the diphenolic acid in the polyamide, the lower will be the molecular weight and viscosity of the polyamide, and accordingly, the maximum amount of diphenolic acid is principally determined by the need for the modifying material to be solid at normal ambient temperatures.

Since the polyamide modifying material is substantially neutral, there is generally little if any reaction between the paint vehicle and modifying material; and the paint composition may typically be cooled, and then reheated and used, as when heated but not applied paint composition is withdrawn from marking apparatus at the end of a working day. Reactive polyamides may be used in the paint vehicle—as a curing agent for an epoxy resin, for example—, but such a reactive component should, as noted above, be kept separate from a coreactant until immediately prior to application to a paved surface.

The modifying material is often melted and blended with pigments, fillers, and additives as well as retroreflective elements, and then cooled and pulverized to form a solid particulate material for mixture with the paint vehicle. The particulate material is generally included in powder form that passes a 20-mesh screen (U.S. Standard) but gives satisfactory results when rather coarse and chunky with a diameter size of one-fourth inch or more. At sizes above one-fourth inch, however, the paint composition becomes more difficult to handle. Quite fine powder may also be used, though the paint composition may become too viscous for convenient handling at ambient temperature if too fine powders are added (for example, smaller than about 325 mesh, U.S. Standard). As previously noted, a paint composition of the invention may typically be heated, cooled, and then reheated and used. In the cooled state, after heating, the paint composition exists as a somewhat gelatinous material in which the modifying material is very finely subdivided, and the paint composition may be made available commercially in that condition.

The amount of modifying material in a composition of the invention varies depending on the particular ingredients used and the particular effects desired. The amount of modifying material should not be so large that the viscosity of the paint composition falls outside the desired range, especially at application. On the other hand, the modifying material should be included in amounts sufficient to rapidly provide a firm non-tacky gel-like structure of some strength and unity upon application of the composition. Generally the modifying material comprises at least 5 weight-percent and usually between 20 to 80 weight-percent of the total organic solids (nonvolatile organic binder ingredients, nonvolatile ingredients of organic additives, and nonvolatile organic ingredients in the modifying material) in the composition, with the percentage in preferred road paints generally falling in the range of 30-70 percent.

In road paints of the invention, yellow or white coloring pigments are added in an amount sufficient to color the composition. Fillers or additives are also generally included in the paint to extend it and to achieve particular effects. In general, when pigments, retroreflective elements, fillers, and the like are included in the paint composition, they are added in a proportion of no more than about 450-500 parts per 100 parts of the total nonvolatile organic ingredients in the composition, the proportion being somewhat lower when very fine pigments and fillers are used.

The invention will be further illustrated by the following example:

A composition of the invention was prepared, and markings of that composition were compared with markings formed using a composition as taught in the McKenzie application, Ser. No. 188,448. In both the composition of the invention and the comparison composition, the paint vehicle (a resin-modified drying oil vehicle) plus retroreflective elements, pigments, fillers, and additives were provided by a conventional traffic paint composition that included the following ingredients mixed in a manner known to those skilled in the art:

| | Parts by Weight |
|---|---|
| Phenolic-modified pentaerythritol ester of rosin having an acid number of 17, a softening point of 333° F (167° C), and a viscosity in a 50% solution of toluene of F on the Gardner-Holdt scale at 25° C (Pentalyn 802 A) | 3.6 |
| Linseed oil | 3.6 |
| Tung oil | 3.6 |
| Chlorinated rubber having a chlorine content of 67% and having a viscosity of 17-25 centipoises (Parlon S-20) | 2.7 |
| Lecithin pigment dispersant (70 percent solution in a mixture of naphtha and xylol) | 0.4 |
| Dimethyldioctadecyl ammonium bentonite thixotropic agent | 0.4 |
| Glass beads (70 mesh; refractive index of glass, 1.5) | 32.1 |
| Finely divided magnesium silicate reinforcing filler | 6.1 |
| Extended titanium dioxide pigment | 25.4 |
| Oxime-type antiskinning agent | 0.1 |
| Epichlorohydrin | 0.05 |
| Diglycidyl ether of bisphenol A having an epoxide equivalent weight of 180-195 and a viscosity at 25° C 100-160 poises (Epon 828) | 0.1 |
| Toluol solvent | 13.7 |
| Heptane solvent | 6.4 |
| Methanol solvent | 0.1 |
| Metal naphthenate driers in dilute solution in mineral spirits | 0.4 |

In the composition of the invention, 85 parts by weight of the above conventional traffic paint composition were mixed with 15 parts by weight of solid diphenolic-acid-containing polyamide particles that were passed by a 30-mesh screen (U.S. Standard) and retained on a 100-mesh screen (Emerez 1533 made by Emery Industries; a polyamide reaction product of diphenolic acid, polymerized fatty acid, and alkylene diamine softening at approximately 98°-102° C, having a Gardner-Holdt viscosity (40 percent resin in 91 percent isopropanol) of I and a kinematic viscosity at 160° C of 26-34, the diphenolic acid comprising about 10 weight-percent of the ingredients). The comparison composition included 88 parts of the conventional traffic paint composition described above and 12 parts of 30 to 100 mesh solid particles of a polyamide reaction product of polymerized fatty acid and alkylene diamine containing no diphenolic acid and melting at 221°-239° F by the ball-and-ring method and having a viscosity at 300° F of 5000 centipoises and at 250° F of 2500 centipoises (Versamid 930).

Both compositions were applied to a paved concrete roadway through airless-spraying equipment while heated to about 250° F and under a pressure of about 60 pounds per square inch. Markings of both compositions were traffic-bearing less than 10 seconds after application. The markings were applied in late summer and evaluated periodically into the winter months, when severe freeze-thaw cycles and periodic sanding and plowing of the roadway totally removed all the markings. The following table shows ratings that were made of the different markings periodically during the fall and winter months (a rating of 10 indicates that essentially none of the applied marking has disappeared, a rating of 5 indicates that 50 percent of the marking is still present, and a rating of 0 would indicate that the marking is completely gone).

|  | At application | Two Weeks after application | Five Weeks after application | Seven Weeks after application | Eleven Weeks after application |
|---|---|---|---|---|---|
| Composition of this invention | 10 | 10 | 10 | 8.8 | 5.2 |
| Comparison composition | 10 | 8.2 | 7.7 | 6.4 | 2.1 |

EXAMPLE 2

A paint composition of the invention was prepared using the following ingredients:

|  | Parts by Weight |
|---|---|
| A 60-weight-percent-solids solution in toluol of an alkyd resin comprising soya oil and 30 weight-percent phthalic anhydride (Reichhold P-819-60) | 15.5 |
| Chlorinated rubber having a chlorine content of 67 percent and having a viscosity of 17–25 centipoises (Parlon S-20) | 2.31 |
| Bentonite thixotropic agent | 0.48 |
| Diglycidyl ether of bisphenol A having an epoxide equivalent weight of 180–195 | 0.1 |
| Magnanese drying agent | 0.08 |
| 1,10-phenanthroline drier catalyst | 0.03 |
| Antioxidant | 0.05 |
| Titanium dioxide | 10.5 |
| Calcium carbonate filler | 7.56 |
| Magnesium silicate filler | 8.9 |
| Methyl ethyl ketone | 14.25 |
| Methanol | 0.16 |
| Particulate diphenolic-acid-included polyamide (Emerez 1533; 30-to-100 mesh particulate) | 12 |

Markings were applied to a paved concrete roadway in a hot-climate region that does not experience snow-plowing or the application of sand, the markings being formed both from the comparison composition of Example 1 and the composition of this example. After 10 months, the comparison markings had a rating of eight whereas the markings of this example had a rating of nine.

EXAMPLE 3

Two compositions of this invention were prepared using the ingredients described in Example 1 except that one composition (Sample A) included 10 parts of Emerez 1533 and the second composition (Sample B) included 12 parts of Emerez 1533. The comparison composition described in Example 1, and the composition of this invention described in Example 1, together with Sample A and Sample B were all applied to a paved concrete roadway in a cold-climate region in the spring of the year. After 6½ months, the markings of the comparison composition had an average rating of 2, markings of the Example 1 composition had an average rating of 3.7, markings of Sample A had an average rating of 3.7, and markings of Sample B had an average rating of 4.3.

What is claimed is:

1. A paint composition that rapidly congeals to traffic-bearing condition when sprayed at an elevated temperature onto a paved surface, comprising
   1. a paint vehicle that includes a nonvolatile organic film-forming paint binder and that
      a. is a liquid at normal ambient temperatures of 40° F to 110° F, but
      b. forms a durable adherent nontacky paint film when applied as a thin coating and exposed to said normal ambient temperatures;
   2. a film-forming thermoplastic substantially neutral polyamide reaction product of diphenolic acid, polycarboxylic acid and polyamine, diphenolic acid comprising at least one weight-percent of the ingredients of the reaction product and the reaction product
      a. comprising at least about 5 weight-percent of the nonvolatile organic ingredients of the paint composition,
      b. being a solid at said normal ambient temperatures,
      c. being substantially insoluble in the paint vehicle at said normal ambient temperatures, and
      d. forming an at least substantially dissolved sprayable liquid blend with the paint vehicle at an elevated temperature above 110° F; and
   3. pigments in an amount sufficient to color the paint composition.

2. A paint composition of claim 1 in which diphenolic acid comprised at least 5 weight-percent of the ingredients of the polyamide reaction product.

3. A paint composition of claim 1 in which the film-forming paint binder of the paint vehicle is dissolved in a volatile solvent.

4. A paint composition of claim 1 in which the paint vehicle forms a cured paint film.

5. A paint composition of claim 1 in which the paint vehicle comprises a film-forming paint binder selected from the group consisting of drying oils, alkyd resins, polyurethane resins, and epoxy resins.

6. A paint composition of claim 1 in which the polyamide reaction product comprises between about 20 and 80 weight-percent of the nonvolatile organic ingredients of the paint composition.

7. A paint composition of claim 1 in which the polyamide reaction product comprises between about 30 and 70 weight-percent of the nonvolatile organic ingredients of the paint composition.

8. A paint composition of claim 1 which includes retroreflective elements to make applied markings retroreflective.

9. A method for forming a paint marking on a paved surface that bears traffic rapidly after application comprising
  I. heating to a predetermined elevated temperature above 110° F and below the temperature at which it decomposes a paint composition that comprises
  1. a paint vehicle that includes a nonvolatile organic film-forming paint binder and that
      a. is a liquid at normal ambient temperatures of 40° to 110° F, but
      b. forms a durable adherent nontacky paint film when applied as a thin coating and exposed to said normal ambient temperatures;
  2. a film-forming thermoplastic substantially neutral polyamide reaction product of diphenolic acid, polycarboxylic acid and polyamine; diphenolic acid comprising at least one weight-percent of the ingredients of the reaction product, and the reaction product
      a. comprising at least about 5 weight-percent of the nonvolatile organic ingredients of the paint composition,
      b. being a solid at said normal ambient temperatures,
      c. being substantially insoluble in the paint vehicle at said normal ambient temperatures, and
      d. forming an at least substantially dissolved sprayable liquid blend with the paint vehicle at said elevated temperature;
  3. pigments in an amount sufficient to color the paint composition; and
  II. coating the composition onto the paved surface while it is at said elevated temperature.

10. A method of claim 9 in which the paint composition is coated by airless-spraying apparatus.

* * * * *